United States Patent
Wagner et al.

(10) Patent No.: US 8,841,874 B2
(45) Date of Patent: Sep. 23, 2014

(54) METHOD OF DETECTING AN OPERATING CONDITION OF AN ELECTRIC STEPPER MOTOR

(75) Inventors: Jens Wagner, Langen (DE); Armin Dietrich, Aschaffenburg (DE); Kai Dieffenbach, Egelsbach (DE); Marco Bodenmüller, Waghäusel (DE); Jürgen Rohn, Rodgau (DE); Wolfgang Wiewesiek, Darmstadt (DE)

(73) Assignee: Spansion LLC, Sunnyvale, CA (US)

( * ) Notice: Subject to any disclaimer, the term of this patent is extended or adjusted under 35 U.S.C. 154(b) by 282 days.

(21) Appl. No.: 13/125,462

(22) PCT Filed: Nov. 11, 2008

(86) PCT No.: PCT/EP2008/065314
§ 371 (c)(1),
(2), (4) Date: Jul. 22, 2011

(87) PCT Pub. No.: WO2010/054680
PCT Pub. Date: May 20, 2010

(65) Prior Publication Data
US 2012/0019186 A1    Jan. 26, 2012

(51) Int. Cl.
*H02P 8/00* (2006.01)
*H02P 8/34* (2006.01)

(52) U.S. Cl.
CPC .................. *H02P 8/34* (2013.01)
USPC ........... 318/696; 318/685; 318/560; 318/671; 361/23; 361/154; 324/600

(58) Field of Classification Search
CPC .............. F01L 2009/0405; H01F 2007/185; H02K 41/03; H02P 25/027; H02P 6/18; H02P 8/34
USPC ........... 318/696, 685, 560, 671; 361/23, 154; 324/600
See application file for complete search history.

(56) References Cited

U.S. PATENT DOCUMENTS 4,476,421 A * 10/1984 Moriguchi ............... 318/696
4,658,194 A * 4/1987 Richter et al. ............ 318/696
(Continued)

FOREIGN PATENT DOCUMENTS

EP     1 760 875 A1    3/2007
EP     1760875 A1 *    3/2007  .......... H02P 8/08
(Continued)

OTHER PUBLICATIONS

English-Language Abstract for Japanese Patent Publication No. 08-033398 A, published Feb. 2, 1996; 1 page.
(Continued)

*Primary Examiner* — Rita Leykin
(74) *Attorney, Agent, or Firm* — Sterne, Kessler, Goldstein & Fox P.L.L.C.

(57) ABSTRACT

An electrical stepper motor comprises a magnetical rotor and at least two electromagnetical driving coils for causing rotation of the rotator. A method of detecting an operating condition of the as e.g. a stall state of the electrical stepper motor comprises the steps of connecting one contact pin (P, M) of at least one of the electromagnetical driving coils via a high-impedance resistor (R1, R2) to a defined voltage source during a non-activated state of the driving coil, detecting a voltage induced at the driving coil during the non-activated state and converting the detected voltage into a digital signal, and digitally analyzing the digital signal and deriving an operating condition of the rotor by evaluation of the signal waveform including positive and negative components of the signal.

13 Claims, 5 Drawing Sheets

(56) References Cited

U.S. PATENT DOCUMENTS

| | | | |
|---|---|---|---|
| 4,684,866 A * | 8/1987 | Nehmer et al. | 318/696 |
| 4,851,755 A | 7/1989 | Fincher | |
| 5,032,781 A | 7/1991 | Kronenberg | |
| 5,043,643 A * | 8/1991 | Hedlund et al. | 318/254.2 |
| 5,072,166 A * | 12/1991 | Ehsani | 318/696 |
| 5,264,770 A * | 11/1993 | Coutu | 318/696 |
| 5,287,050 A | 2/1994 | Kronenberg et al. | |
| 5,883,483 A * | 3/1999 | Nagata et al. | 318/696 |
| 6,611,072 B1 | 8/2003 | Ellerthorpe et al. | |
| 6,680,597 B1 * | 1/2004 | Catellani et al. | 318/696 |
| 6,861,817 B2 | 3/2005 | Pigott et al. | |
| 6,900,657 B2 * | 5/2005 | Bui et al. | 324/765.01 |
| 6,956,351 B2 | 10/2005 | Yamada | |
| 7,170,254 B2 * | 1/2007 | Yamada | 318/696 |
| 7,224,140 B2 | 5/2007 | Arefeen et al. | |
| 7,432,682 B2 | 10/2008 | Rondot et al. | |
| 7,705,555 B2 * | 4/2010 | Pinewski et al. | 318/696 |
| 2005/0024008 A1 * | 2/2005 | Yamada | 318/685 |
| 2005/0062494 A1 | 3/2005 | Bui et al. | |
| 2005/0116678 A1 * | 6/2005 | Yamada | 318/685 |
| 2005/0140327 A1 | 6/2005 | Carolan | |
| 2005/0231286 A1 | 10/2005 | Gotou et al. | |
| 2011/0133682 A1 * | 6/2011 | Egger et al. | 318/685 |

FOREIGN PATENT DOCUMENTS

| | | |
|---|---|---|
| JP | 08-033398 A | 2/1996 |
| JP | 2005-020880 A | 1/2005 |
| JP | 2007-511192 A | 4/2007 |

OTHER PUBLICATIONS

International Search Report directed to related International Patent Application No. PCT/EP2008/065314, mailed Jul. 20, 2009; 3 pages.
International Preliminary Report on Patentability and Written Opinion of the International Searching Authority directed to related International Patent Application No. PCT/EP2008/065314, issued May 17, 2011; 6 pages.

\* cited by examiner top: coil A with connection pins P and M
bottom: coil B with connection pins P and M top: coil A with connection pins P and M
bottom: coil B with connection pins P and M

METHOD OF DETECTING AN OPERATING CONDITION OF AN ELECTRIC STEPPER MOTOR

CROSS-REFERENCE TO RELATED APPLICATION

This application is a National Stage entry of International Application No. PCT/EP2008/065314, filed Nov. 11, 2008, the disclosure of the prior application is incorporated in its entirety by reference

TECHNICAL FIELD

The present invention relates to a method and a device for detecting an operating condition, in particular a stall state of an electrical stepper motor, which comprises a magnetical rotor and at least two electromagnetical driving coils for causing a rotation of the rotator

BACKGROUND ART

There already exist methods for detecting the stall state of the rotor of a stepper motor. They use the fact that a change in the movement of the motor will cause a variation of the BEMF (Back electro-magnetic force) and thus also the induced voltage. The current in the active coil is also subject to change. The known methods for stall detection differ in their measurement methods and the way the measured signals are analyzed.

U.S. Pat. No. 5,032,781 and U.S. Pat. No. 5,287,050 describe a method and circuit for operating a stepping motor having several windings, wherein a movement of the stepping motor induces a voltage in a winding which is not required at the time for generating a propulsive force. This induced voltage is evaluated using a threshold detection element. After the stepping motor is connected, the stepping motor is operated in a predetermined direction, whereupon a stopping of the stepping motor is detected by the absence of the induced voltage. A memory containing the instantaneous position of the stepping motor is then set to a predetermined value.

In the stall state detection apparatus disclosed in U.S. Pat. No. 6,861,817 B2 a stepped rotary motion is imparted to the rotor of a stepping motor by alternately driving at least first and second coils which interact with a plurality of magnetic poles on the rotor. When each of the coils transitions from a driven to a non-driven state, the continued motion of the rotor causes a back electro-motive force to be generated in the coil. The electro-motive forces produced by the coils are rectified, integrated, and then compared with a threshold to determine if a motor stall condition exists.

The detection device disclosed in U.S. Pat. No. 7,224,140 B2 detects a stall in a stepper motor by determining a motor winding current for each stepper pulse and determining if the winding current of a particular stepper pulse meets predetermined criteria. The motor winding current may be determined by measuring a voltage across an ON field effect transistor during a stepper pulse and calculating a winding current using an assumed ON field effect transistor resistance. The predetermined criteria may by a calculated motor winding current greater than a predetermined threshold, greater than prior pulse by more than a predetermined threshold or greater than a prior pulse by more than a predetermined factor.

SUMMARY OF THE INVENTION

The patent aims to improve existing methods of stepper motor zero point stall detection.

It is in particular an object of the present invention to provide a method and device for detecting an operating condition, in particular a stall state of an electrical stepper motor which is applicable to a wide range of different stepper motors without hardware modifications.

To achieve this object, the present invention provides a method of detecting an operating condition of an electrical stepper motor comprising the steps of connecting one contact pin of at least one of the electromagnetical driving coils via a high-impedance resistor to a defined voltage source during a non-activated state of the driving coil, detecting a voltage induced at the driving coil during the non-activated state and converting the detected voltage into a digital signal, and digitally analyzing the digital signal and deriving an operating condition of the rotor by evaluation of the signal waveform including positive and negative components of the signal.

The method of the invention allows a reliable and relatively simple detection of a stall state of different stepper motors having different induced voltage characteristics by merely adapting software parameters of the signal analyzing circuitry. This allows to use the same hardware configuration for many different stepper motors and thus lower development and manufacturing costs.

According to an embodiment of the present invention one contact pin of the driving coil is connected via a first high-impedance resistor to an operating voltage and the other contact pin is connected via a second high-impedance resistor to ground voltage during a non-activated state of the driving coil.

The voltage induced at the driving coil during the non-activated state can be measured between one of the contact pins and the ground voltage or alternatively between the two contact pins of the driving coil.

In another embodiment of the present invention one contact pin of the driving coil is connected via a first high-impedance resistor to an operating voltage and via a second high-impedance resistor to ground voltage during a non-activated state of the driving coil. The voltage induced at the driving coil is measured between the other contact pin and ground voltage.

The step of digitally analyzing the signal may comprise obtaining minimum and/or maximum signal values, a pulse polarity and/or integrating or differentiating characteristics of the signal.

In a further embodiment of the present invention an error diagnosis step of the electrical stepper motor is provided, wherein a DC voltage at the driving coil is detected at a non-activated state thereof.

The present invention further provides a detection device for detecting an operating condition of an electrical stepper motor comprising a high-impedance resistor connected between one contact pin of at least one of the electromagnetical driving coils and a defined voltage source, a analog-digital-converter adapted to convert a detected voltage induced at the driving coil during the non-activated state thereof into a digital signal, and a digital signal processor adapted to digitally analyze the digital signal and derive an operating condition of the rotor by evaluation of the signal waveform including positive and negative components of the signal.

BRIEF DESCRIPTION OF THE DRAWINGS

Various aspects of the method and device according to the present invention are illustrated by way of example, and not by way of limitation, in the accompanying drawings, wherein.

DETAILED DESCRIPTION

The detailed description set forth below in connection with the accompanying drawings is intended as a description of various preferred embodiments of the invention and is not intended to represent the only embodiments in which the invention may be practiced. The detailed description includes specific details for the purpose of providing a thorough understanding of the invention. However, it will be apparent to those skilled in the art that the invention may be practiced without theses specific details. In some instances, well known structures and components are shown in block diagram form in order to avoid obscuring the concepts of the invention.

The present invention describes a method for stepper motor zero point stall detection and in addition a method that detects erroneous connections between the motor coils and the stepper motor controller. The methods are explained on a two-phase stepper motor, but they are also applicable to any other types with more coils as well.

Figure 1:
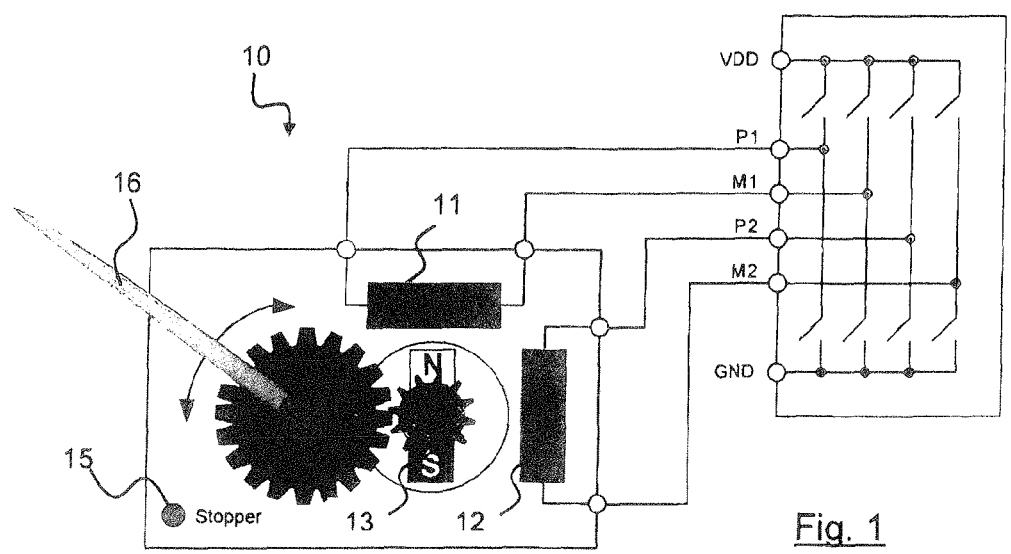
FIG. 1 is a schematic illustration of an electric stepper motor, to which the present invention may be applied, FIG. 2 schematically illustrates the operating principle of an electric stepper motor.

An example of an electrical stepper motor 10 with a control unit is schematically illustrated in FIG. 1. Stepper motors are widely used, in particular for instrumentation applications (e.g. in automobiles) where the precise adjustment of a needle 16 to the zero position of the instrument scale is mandatory. For this purpose a rotor 13 must be aligned to a fixed reference point, a mechanical stall or zero position of the stepper motor as e.g. a stopper 15 shown in FIG. 1. With such a reference point no further sensor hardware becomes necessary to perform the zero point adjustments.

Figure 2:
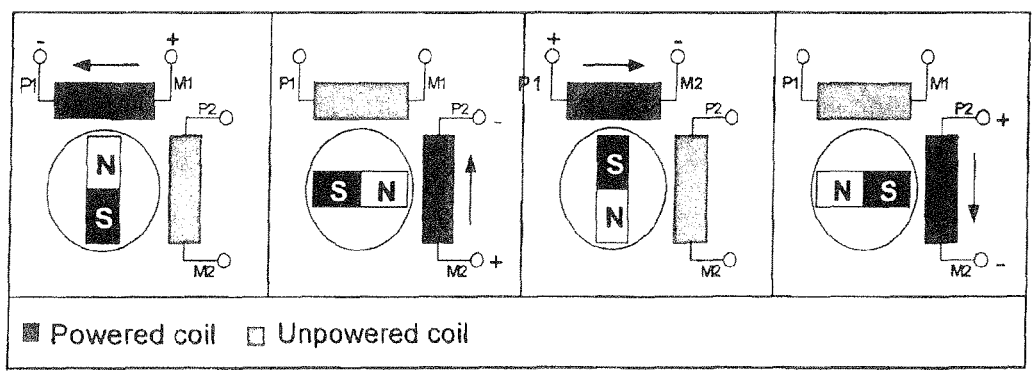

The control unit conveys voltages to the motor pins and controls the current flow in the driving coils 11, 12 which generate a magnetic field. This magnetic field attracts the next antipole of the permanent magnets on the rotor 13 and causes it to move. By applying a special switching order (stepping scheme), a rotating magnetic field is generated which causes the rotor 13 to rotate continuously as schematically illustrated in FIG. 2.

The rotating rotor 13, with its permanent magnets, induces a voltage in the stator coils 11, 12. Dependent on the rotation direction, this voltage can be of positive or negative level. If the rotor 13 is stalled, there is no induction or induced voltage.

The induced voltage can not be measured directly when the respective coil 11, 12 is actively driven (low impedance) by the control unit. Therefore an electrical commutation is applied that uses steps with at least one coil being set in high impedance state, which enables measurement of the induced voltage.

Figure 3B:
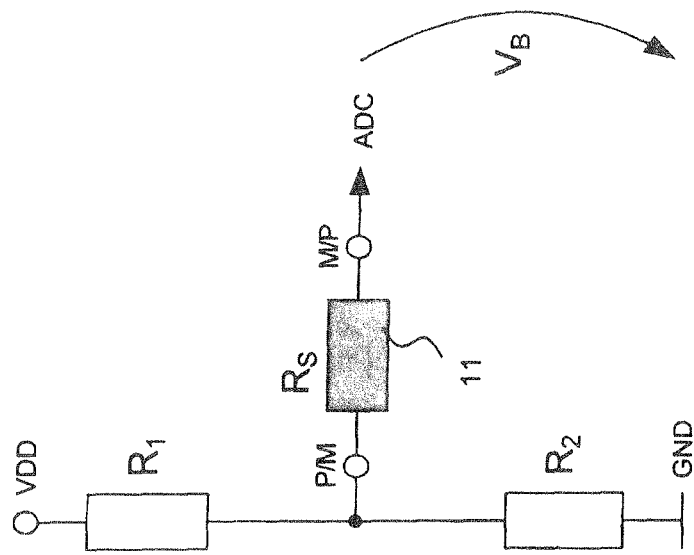
FIGS. 3a and 3b show a first and second embodiment, respectively, of a device for detecting an operating condition of an electric stepper motor.
Figure 3A:
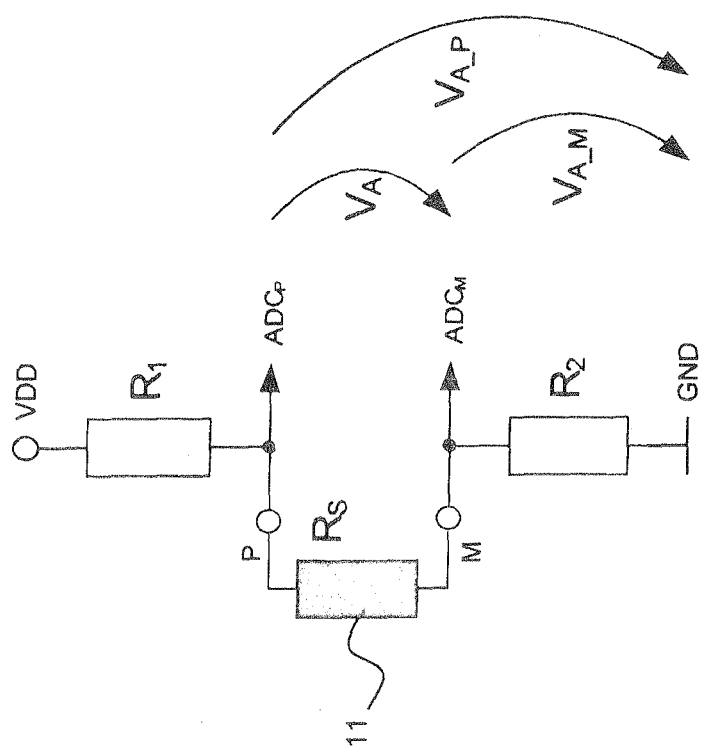

FIGS. 3a and 3b show a first and second embodiment, respectively, of a configuration to measure the voltage induced in the driving coil 11. High-impedance pull-up and pull-down resistors R1 and R2 are provided to put the coil 11 in a high impedance state, wherein high impedance means that the condition R1, R2>>Rs of the coil is fulfilled. The pull resistors R1, R2 connect a non-powered coil 11 to a reference voltage. By this method the coil is clamped to a fixed DC offset voltage on which the induced AC voltage overlays. The induced voltage on this coil is sampled by an analogue-to-digital converter (ADC) and further processed by the microprocessor in the control unit. The measurement can be done single-ended (only at one pin of the coil) or differential (at both pins P, M of the coil). This scalability allows adapting the system for a lower number of necessary analogue channels on one hand or a more disturbance-tolerant measuring system with higher signal-to-noise-ratio on the other hand.

The contact pins P, M of the coils 11, 12 of the stepper motor (see FIG. 1) are connected to dedicated pins of the control unit. These pins are able to drive an active high or low voltage to power one (or more) coil(s). At any time, however, at least one coil is not driven by the control unit. In this state the pins of this coil are switched to high-impedance input mode and the pull-up and pull-down resistors R1, R2 (see FIG. 3) are connecting them to reference voltages, typically the supply voltage VDD of the control unit for one pin and ground potential GND for the other pin. The connection and disconnection of the pull resistors R1, R2 is automatically performed by applying the input or output mode for the respective pins. Thus a parasitic current flow in driving mode of the respective coil is avoided.

FIG. 3a shows a first embodiment of the voltage measurement configuration according to the present invention. The driving coil 11 is connected in series with the resistors R1, R2. A first pin P of the driving coil 11 is connected via a first high-impedance resistor R1 to the supply voltage VDD and a second pin M of the driving coil via a second high-impedance resistor R2 to ground voltage GND.

The circuit configuration shown in FIG. 3b also sets the coil to a DC offset voltage. The difference with respect to the circuit of FIG. 3a is that the unpowered coil 11 is connected in parallel to the pull-up/down resistors R1, R2 (for AC signals).

The circuits shown in FIGS. 3a and 3b offer two options for measurement and thus allow flexible adjustment to application demands: single ended measurement of voltage $V_{A\_P}$, $V_{A\_M}$ (FIG. 3a) or $V_B$ (FIG. 3b) or differential measurement of voltage $V_A$ (FIG. 3a). The following Table 1 compares both options:

TABLE 1

Measurement options

| | Suitable for | Advantages |
|---|---|---|
| Single-ended measurement ($V_{A\_P/M}$, $V_B$) | Stepper motors with strong BEMF | Only one ADC channel per coil necessary (reduces amount by 50%) |
| Differential measurement ($V_A$) | Stepper motors with weak BEMF and/or environments with external disturbing influences | Twice the signal amplitude, eliminates variable DC offset automatically, noise immunity |

Figure 4:
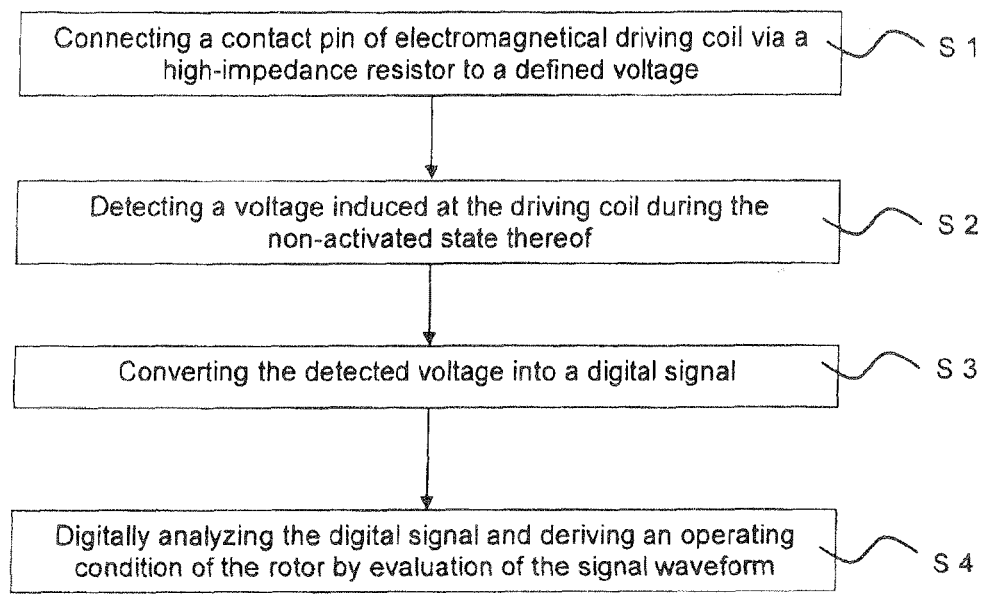
FIG. 4 shows a flowchart of an embodiment of the method for detecting an operating condition of an electric stepper motor according to the present invention, FIG. 5 schematically illustrates voltages at contact pins of the driving coils of an electric stepper motor during operation.

FIG. 4 shows a flowchart of an embodiment of the method for detecting an operating condition of an electric stepper motor according to the present invention.

In step S1, during a non-activated state of the driving coil, a contact pin P, M of at least one of the electromagnetical driving coils is connected via a high-impedance resistor R1, R2 to a defined voltage source. In step S2, a voltage induced at the driving coil during the non-activated state is detected and in subsequent step S3 converted by an analog-digital-converter into a digital signal. In analyzing step S4 the digital signal is analyzed and an operating condition of the rotor is determined by evaluation of the signal waveform including positive and negative components of the signal.

The algorithm performed during the analyzing step S4 processes the sampled data in a standard digital signal processor (which is known as such to the skilled person and therefore not shown in the figures nor described in the specification) preferably evaluates the signal amplitude, phase of positive and negative pulses as well as differential and integral characteristics to build up a so called "Form Factor" value. Different types of stepper motors can have different characteristics for which the algorithm can be adapted by corresponding programming the digital signal processing circuitry without changing any hardware components. The measurement device according to the present invention can therefore be flexibly used for different types of stepper motors such that cost reductions due to larger manufacturing volumes can be realized.

In general, the normal rotation of the rotor results in a large Form Factor. A stalled rotor generates a small Form Factor. If the Form Factor falls below an application specific threshold, the stall event is detected. The position of the rotor is known by the last step that was done and thus allows precise zero point alignment of the rotor. The usage of the Form Factor has advantages with respect to the commonly used method of applying a simple threshold value for the amplitude of the induced voltage because more waveform characteristics and in particular both polarities of the induced voltage are included for stall detection. For some stepper motor types a simple threshold is even not applicable for distinguishing regular rotation from the stall event.

By shifting the reference voltage level of the coil by a DC offset that lies within the input range of the ADC, the whole induced AC signal can be measured. Neither over- nor undershoots are clipped. Therefore forward as well as backward movements of the rotor can be measured and the analyzed Form Factor has a higher significance.

The waveform of the obtained signal directly represents the movement speed and direction of the rotor. With each new full step the rotor is attracted to the next magnetic pole generated by the conducting coil. Due to the inertia of the rotor (and additional mechanical parts connected to it), it does not directly stop at the centre of the stator pole. It "overshoots" this position at first, moves back, overshoots again, moves forward, and so on. The voltage signal therefore shows a more or less damped oscillation depending on the motor type and rotor load.

To be able to measure this forward and backward alignment is especially helpful for stepper motors with a weak BEMF to increase the signal amplitude of the induced voltage.

The circuit configuration of FIG. 3a can in addition be used for an automatic calibration at the beginning of a stall detection by measuring the DC offset level to handle variations of hardware components as well as external influences like temperature drift.

By applying the circuit of FIG. 3a and measuring the absolute values of $ADC_P$ and $ADC_M$, the difference $V_A$ between them can be used to check the proper connection of the stepper motor coils. Non-connected and high-resistance connections can be detected without the need to drive the stepper motor. If a stepper motor coil is connected to the driving pins (P and M), the series coil resistance can be regarded as short circuit between these two pins, because $R_1, R_2 \gg R_S$. The voltage $V_A$ now is nearly zero and indicates a proper connection. If the stepper motor is not connected to the driving pins, the resistance between points P and M can be regarded as infinite. $R_1$ pulls up the voltage on $ADC_P$ to VDD, while $R_2$ pulls down $ADC_M$ to GND level. Thus, a voltage difference of $V_A \approx$ VDD can be measured, indicating a connection error. Voltage differences between the above mentioned states may indicate high impedance connections or damaged stepper motor coils.

Figure 5:
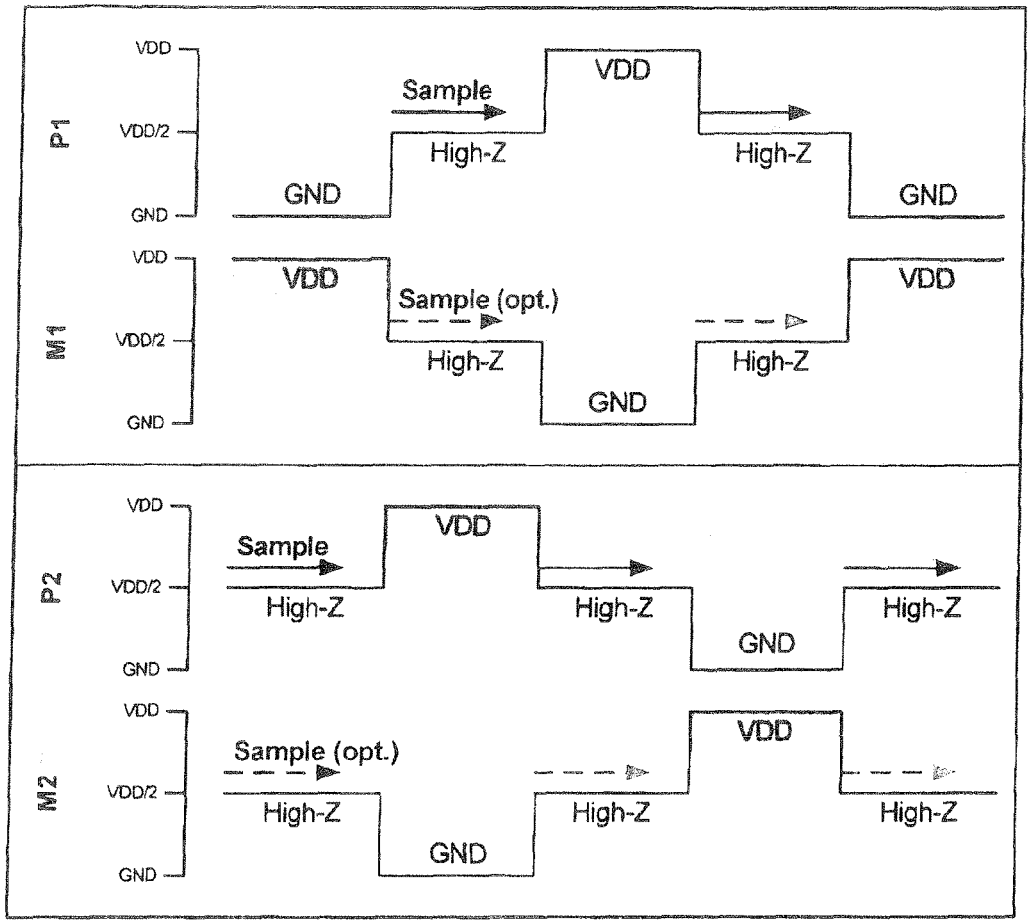

During operation (after the calibration and error diagnosis) the stepper motor is driven with a stepping scheme for a rotation in the desired direction. FIG. 5 schematically illustrates a stepping scheme for two phases/coils. It shows the driving voltage sequence ("VDD", "GND") and the unpowered states ("High-Z"). During the unpowered states, the induced voltage is measured with one of the above described measurement circuits. If the measurement is done single-ended, only one point per coil is measured (for example P1, P2). When using differential measurement, the contact pins M1, M2 are also connected. The time duration of each step is an application specific setting. It depends on the strength of the BEMF of the respective stepper motor. The time must be long enough to derive a good signal-to-noise-ratio of the measured induced voltage.

Figure 6A:
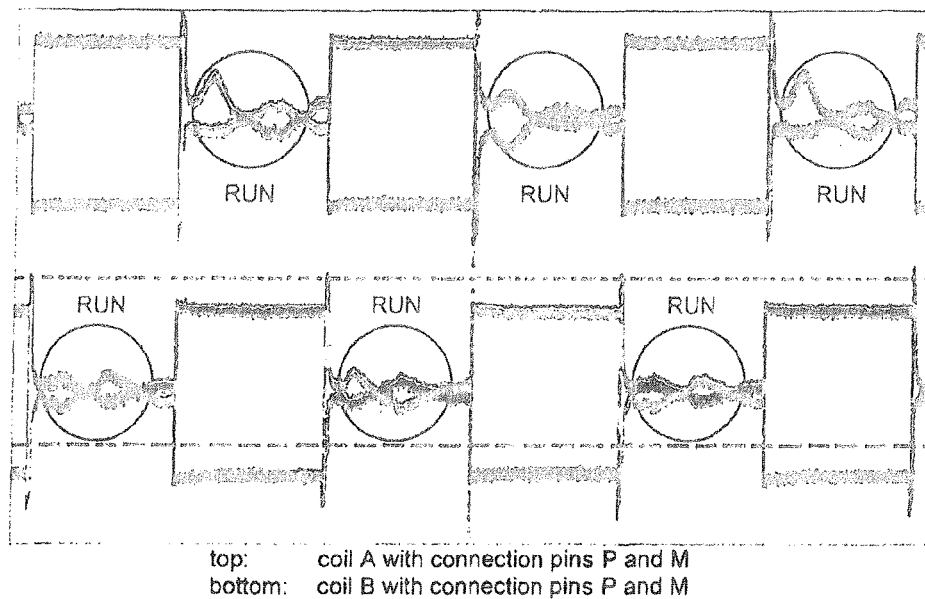
FIGS. 6a and 6b show measured voltages at contact pins of the driving coils of an electric stepper motor during rotation and in stall state.
Figure 6B:
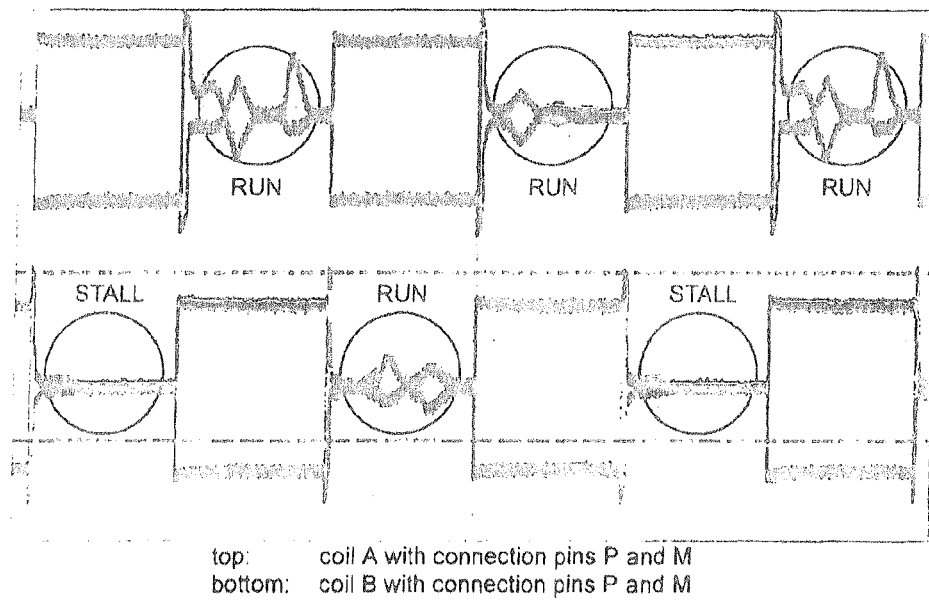

FIGS. 6a and 6b show voltage measurement results at the connection pins P and M of coils A and B of a two-phase stepper motor in different operating conditions using the circuit arrangement according to the invention as shown in FIG. 3.

During motor operation, the voltage signal is continuously sampled by the ADC with each electrical step. As long as the rotor is moving, the control unit measures a characteristic signal similar to the High-Z steps shown in FIG. 6a marked 'RUN'. If the rotor reaches the stall position, the movement of the rotor is damped or completely blocked, resulting in a strongly reduced signal (see High-Z steps of coil B in FIG. 6b marked 'STALL').

Depending on the motor type that is used, the algorithm for processing the sampled waveform may qualify the signal amplitude, polarity of the peaks, integrating and differentiating behaviour in a characteristic "Form Factor" value. The algorithm is adapted such way that only the necessary calculations have to be done.

At stall position, this Form Factor falls below an application specific threshold and triggers the stall event. The position of the rotor is known by the last step that was done and thus allows precise zero point alignment of the rotor of the stepper motor.

The invention claimed is:

1. A method of detecting an operating condition of an electrical stepper motor, which comprises a magnetical rotor and at least two electromagnetical driving coils for causing the magnetical rotor to rotate, the method comprising:

connecting one contact pin of at least one of the electromagnetical driving coils via a resistor to a defined voltage source during a non-activated state of the driving coil;

detecting a voltage induced at the driving coil during the non-activated state and converting the detected voltage into a digital signal; and digitally analyzing the digital signal and deriving the operating condition of the magnetical rotor by evaluating a signal waveform including any positive and negative components of the digital signal, wherein a first contact pin of the driving coil is connected via a first resistor to an operating voltage, and a second contact pin of the driving coil is connected via a second resistor to a ground voltage during the non-activated state of the driving coil.

2. The method of claim 1, wherein the operating condition is a stall state of the electrical stepper motor.

3. The method of claim 1, wherein the voltage induced at the driving coil during the non-activated state is measured between one of the first and second contact pins and the ground voltage.

4. The method of claim 1, wherein the voltage induced at the driving coil during the non-activated state is measured between the first and second contact pins of the driving coil.

5. The method of claim 1, wherein the digitally analyzing the signal comprises obtaining minimum and/or maximum signal values, a pulse polarity and/or integrating or differentiating characteristics of the signal.

6. The method of claim 1, further comprising performing an error diagnosis of the electrical stepper motor, wherein a DC voltage at the driving coil is detected at the non-activated state.

7. A method of detecting an operating condition of an electrical stepper motor, which comprises a magnetical rotor and at least two electromagnetical driving coils for causing the magnetical rotor to rotate, the method comprising:
    connecting one contact pin of at least one of the electromagnetical driving coils via a resistor to a defined voltage source during a non-activated state of the driving coil;
    detecting a voltage induced at the driving coil during the non-activated state and converting the detected voltage into a digital signal; and
    digitally analyzing the digital signal and deriving the operating condition of the magnetical rotor by evaluating a signal waveform including positive and negative components of the digital signal,
    wherein a first contact pin of the driving coil is connected via a first resistor to an operating voltage and via a second resistor to a ground voltage during the non-activated state of the driving coil.

8. A detection device for detecting an operating condition of an electrical stepper motor, which comprises a magnetical rotor and at least two electromagnetical driving coils for causing the magnetical rotor to rotate, the detection device comprising:
    a resistor connected between one contact pin of at least one of the electromagnetical driving coils and a defined voltage source;
    an analog-digital-converter adapted to convert a detected voltage induced at the driving coil during a non-activated state into a digital signal; and
    a digital signal processor adapted to digitally analyze the digital signal and derive the operating condition of the magnetical rotor by evaluating a signal waveform including positive and negative components of the digital signal,
    wherein a first contact pin of the driving coil is connected via a first resistor to an operating voltage, and a second contact pin of the driving coil is connected via a second resistor to a ground voltage during the non-activated state of the driving coil.

9. The detection device of claim 8, wherein the operating condition is a stall state of the electrical stepper motor.

10. A detection device for detecting an operating condition of an electrical stepper motor, which comprises a magnetical rotor and at least two electromagnetical driving coils for causing the magnetical rotor to rotate, the detection device comprising:
    a resistor connected between one contact pin of at least one of the electromagnetical driving coils and a defined voltage source;
    an analog-digital-converter adapted to convert a detected voltage induced at the driving coil during a non-activated state into a digital signal; and
    a digital signal processor adapted to digitally analyze the digital signal and derive the operating condition of the magnetical rotor by evaluating a signal waveform including positive and negative components of the digital signal,
    wherein a first contact pin of the driving coil is connected via a first resistor to an operating voltage and via a second resistor to a ground voltage during the non-activated state of the driving coil.

11. The detection device of claim 10, wherein the operating condition is a stall state of the electrical stepper motor.

12. The method of claim 7, wherein the operating condition is a stall state of the electrical stepper motor.

13. The method of claim 7, wherein the voltage induced at the driving coil is measured between a second contact pin of the driving coil and the ground voltage.

* * * * *